United States Patent
Lee et al.

(10) Patent No.: US 9,630,277 B2
(45) Date of Patent: Apr. 25, 2017

(54) AIRFOIL HAVING BUILT-UP SURFACE WITH EMBEDDED COOLING PASSAGE

(75) Inventors: Ching-Pang Lee, Cincinnati, OH (US); Mrinal Munshi, Orlando, FL (US); Gm S. Azad, Oviedo, FL (US); Jae Y. Um, Winter Garden, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 2172 days.

(21) Appl. No.: 12/723,880

(22) Filed: Mar. 15, 2010

(65) Prior Publication Data
US 2011/0223005 A1 Sep. 15, 2011

(51) Int. Cl.
*F02C 7/12* (2006.01)
*B23P 6/00* (2006.01)
*F01D 5/00* (2006.01)
*F01D 5/14* (2006.01)
*F01D 5/18* (2006.01)

(52) U.S. Cl.
CPC .............. B23P 6/007 (2013.01); F01D 5/005 (2013.01); F01D 5/145 (2013.01); F01D 5/186 (2013.01); *F05D 2230/30* (2013.01); *F05D 2230/80* (2013.01); *F05D 2240/81* (2013.01); *Y10T 29/49318* (2015.01)

(58) Field of Classification Search
CPC .......... B23P 6/007; F01D 5/005; F01D 5/145; F01D 5/186; F05D 2230/30; F05D 2230/80; F05D 2240/81; Y10T 29/49318
USPC .......... 415/115, 191; 416/97 R, 96 R, 193 A; 29/889.721
See application file for complete search history.

(56) References Cited

U.S. PATENT DOCUMENTS

| | | | |
|---|---|---|---|
| 3,800,864 A | 4/1974 | Hauser et al. | |
| 3,844,679 A | 10/1974 | Grondahl et al. | |
| 4,012,167 A | 3/1977 | Noble | |
| 4,017,213 A | 4/1977 | Przirembel | |
| 4,050,133 A | 9/1977 | Cretella et al. | |
| 4,353,679 A | 10/1982 | Hauser | |
| 5,340,278 A * | 8/1994 | Magowan | 416/96 R |
| 5,344,283 A | 9/1994 | Magowan et al. | |
| 5,382,135 A | 1/1995 | Green | |

(Continued)

FOREIGN PATENT DOCUMENTS

| | | |
|---|---|---|
| EP | 0940561 A1 | 9/1999 |
| EP | 1669544 A1 | 6/2006 |

(Continued)

*Primary Examiner* — Richard Edgar
*Assistant Examiner* — Jesse Prager

(57) ABSTRACT

A component in a gas turbine engine includes an airfoil extending radially outwardly from a platform associated with the airfoil. The airfoil includes opposed pressure and suction sidewalls, which converge at a first location defined at a leading edge of the airfoil and at a second location defined at a trailing edge of the airfoil opposed from the leading edge. The component includes a built-up surface adjacent to the leading edge at an intersection between the pressure sidewall and the platform, and at least one cooling passage at least partially within the built-up surface at the intersection between the pressure sidewall and the platform. The at least one cooling passage is in fluid communication with a main cooling channel within the airfoil and has an outlet at the platform for providing cooling fluid directly from the main cooling channel to the platform.

18 Claims, 4 Drawing Sheets

(56) References Cited

U.S. PATENT DOCUMENTS

| | | | |
|---|---|---|---|
| 5,975,851 A | 11/1999 | Liang | |
| 6,120,249 A | 9/2000 | Hultgren et al. | |
| 6,419,446 B1 | 7/2002 | Kvasnak et al. | |
| 6,478,540 B2 | 11/2002 | Abuaf et al. | |
| 6,481,967 B2 | 11/2002 | Tomita et al. | |
| 6,641,360 B2 | 11/2003 | Beeck et al. | |
| 6,719,529 B2 | 4/2004 | Tiemann | |
| 6,830,432 B1 | 12/2004 | Scott et al. | |
| 6,969,232 B2 * | 11/2005 | Zess et al. | 415/191 |
| 7,131,817 B2 | 11/2006 | Keith et al. | |
| 7,134,842 B2 | 11/2006 | Tam et al. | |
| 7,144,215 B2 | 12/2006 | Keith et al. | |
| 7,217,096 B2 | 5/2007 | Lee | |
| 7,249,933 B2 * | 7/2007 | Lee et al. | 416/97 R |
| 7,597,536 B1 * | 10/2009 | Liang | 415/138 |
| 7,621,718 B1 | 11/2009 | Liang | |
| 2006/0140768 A1 * | 6/2006 | Tam et al. | 416/193 A |
| 2007/0258810 A1 | 11/2007 | Aotsuka et al. | |
| 2008/0135530 A1 | 6/2008 | Lee et al. | |

FOREIGN PATENT DOCUMENTS

| | | |
|---|---|---|
| JP | 2006170198 A | 6/2006 |
| JP | 2007224918 A | 8/2007 |
| JP | 2008031999 A | 2/2008 |

* cited by examiner

AIRFOIL HAVING BUILT-UP SURFACE WITH EMBEDDED COOLING PASSAGE

FIELD OF THE INVENTION

The present invention relates to turbine engines, and, more particularly, to cooling passages provided in the sidewall of a component, such as the sidewall for an airfoil in a gas turbine engine.

BACKGROUND OF THE INVENTION

In a turbomachine, such as a gas turbine engine, air is pressurized in a compressor section then mixed with fuel and burned in a combustor section to generate hot combustion gases. The hot combustion gases are expanded within a turbine section of the engine where energy is extracted to power the compressor section and to produce useful work, such as turning a generator to produce electricity. The hot combustion gases travel through a series of turbine stages within the turbine section. A turbine stage may include a row of stationary airfoils, i.e., vanes, followed by a row of rotating airfoils, i.e., turbine blades, where the turbine blades extract energy from the hot combustion gases for powering the compressor section and providing output power. Since the airfoils, i.e., vanes and turbine blades, are directly exposed to the hot combustion gases, they are typically provided with internal cooling channels that feed a cooling fluid, such as compressor bleed air, through the airfoil and through various film cooling holes around the surface thereof.

One type of airfoil extends from a radially inner platform at a root end to a radially outer portion of the airfoil, and includes opposite pressure and suction sidewalls extending axially from leading to trailing edges of the airfoil. The cooling channel extends inside the airfoil between the pressure and suction sidewalls.

After periods of use, it has been found that areas adjacent to locations near the airfoil leading edges where the airfoils intersect with the platform lacks adequate cooling. Therefore, these areas are susceptible to damage, i.e., due to overheating and oxidation, such that repair/replacement procedures are required.

SUMMARY OF THE INVENTION

In accordance with a first embodiment of the present invention, a method is provided of servicing an airfoil of a gas turbine engine. A surface is built up adjacent to a leading edge of the airfoil at an intersection between the airfoil and a platform associated with the airfoil by applying a high heat tolerant material to the surface. At least one cooling passage is formed at least partially within the built-up surface at the intersection between the airfoil and the platform. The at least one cooling passage is in fluid communication with a main cooling channel within the airfoil and has an outlet at the platform for providing cooling fluid directly from the main cooling channel to the platform.

In accordance with a second embodiment of the invention, a component is provided in a gas turbine engine. The component includes an airfoil extending radially outwardly from a platform associated with the airfoil. The airfoil includes a pressure sidewall and a suction sidewall opposed from the pressure sidewall. The pressure and suction sidewalls converge at a first location defined at a leading edge of the airfoil and at a second location defined at a trailing edge of the airfoil opposed from the leading edge. The component includes a built-up surface adjacent to the leading edge at an intersection between the pressure sidewall and the platform, and at least one cooling passage at least partially within the built-up surface at the intersection between the pressure sidewall and the platform. The at least one cooling passage is in fluid communication with a main cooling channel within the airfoil and has an outlet at the platform for providing cooling fluid directly from the main cooling channel to the platform.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
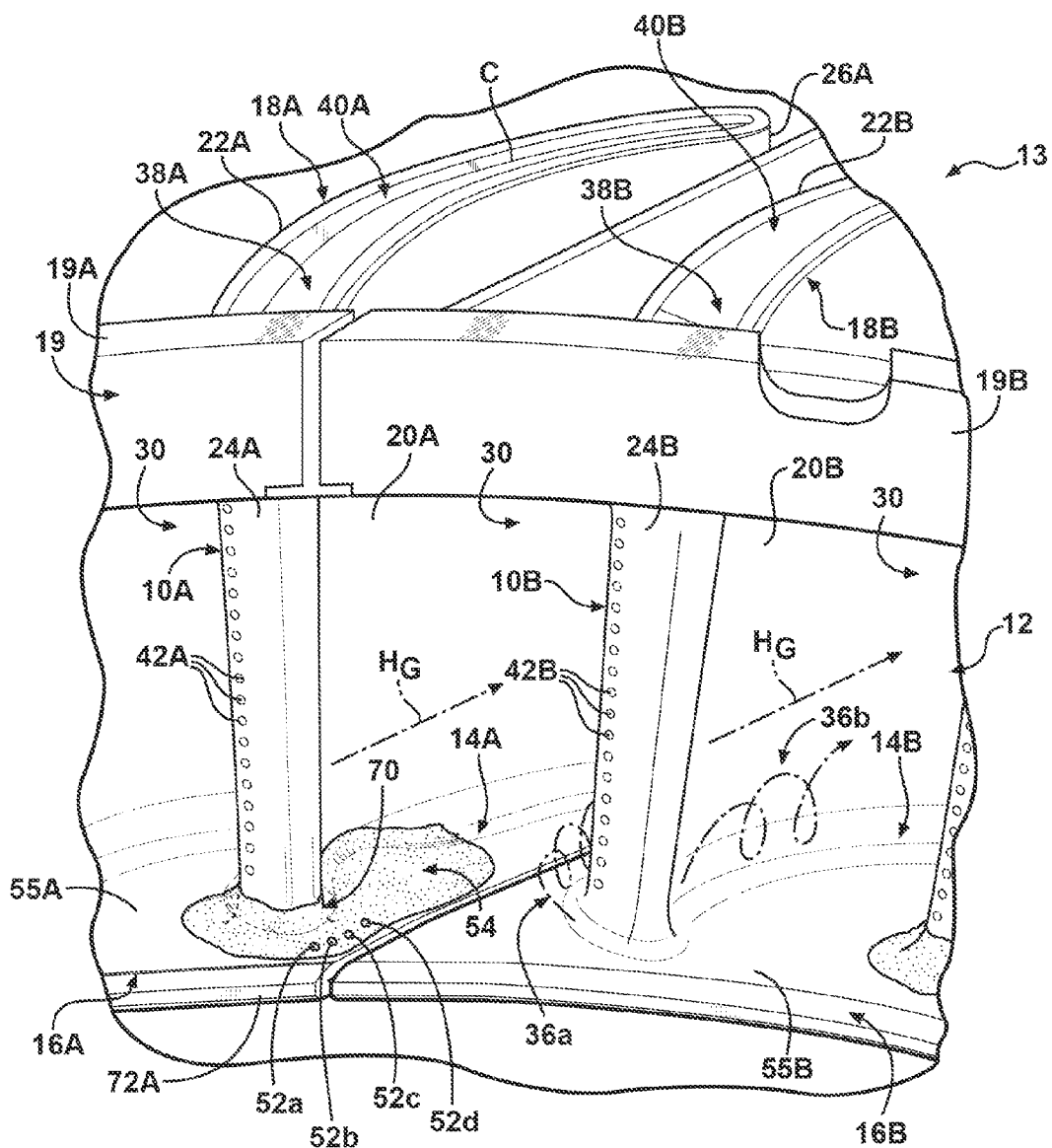
FIG. 1 is a perspective view of a portion of a turbine section of an engine including a plurality of airfoils according to an embodiment of the invention.

Referring to FIG. 1, first and second exemplary airfoils 10A, 10B, i.e., stationary vanes, are shown. The airfoils 10A, 10B are adjoined in the circumferential direction together and form part of a row of airfoils 12 that extends circumferentially about a turbine rotor (not shown) in a turbine engine. Hot combustion gases $H_G$ created in a conventional combustor assembly (not shown) are discharged into a turbine section 13 in which the airfoils 10A, 10B are employed. Rows of the stationary vanes, such as the row of airfoils 12, direct the hot combustion gases $H_G$ toward rows of rotating turbine blades (not shown), which blades are caused to rotate and cause corresponding rotation of the turbine rotor.

Each of the airfoils 10A, 10B extends radially outwardly from and is integrally joined at a root end 14A, 14B thereof to a corresponding radially inner shroud or platform 16A, 16B. The platforms 16A, 16B are suspended radially outwardly from a casing structure (not shown). While pairs of the airfoils 10A, 10B are illustrated herein as sharing a platform 16A, 16B, it is noted that additional or fewer airfoils 10A, 10B may be associated with each platform 16A, 16B. Each of the airfoils 10A, 10B is integrally joined at a tip end 18A, 18B thereof to a radially outer shroud 19, which outer shroud 19 may include one or more pieces or sections 19A, 19B that each may be associated with one or more of the airfoils 10A, 10B.

As shown in FIG. 1, each airfoil 10A, 10B includes a generally concave pressure sidewall 20A, 20B and an opposed, generally convex suction sidewall 22A, 22B. The pressure and suction sidewalls 20A, 20B and 22A, 22B of each airfoil 10A, 10B converge at a first location defined at a leading edge 24A, 24B and at a second location defined at a trailing edge 26A (the trailing edge of the second airfoil 10B is not shown) opposed from the leading edge 24A, 24B of the respective airfoil 10A, 10B. The pressure and suction sidewalls 20A, 20B and 22A, 22B extend in a chordal direction C, i.e., in a generally axial direction of the engine, between the opposite leading and trailing edges 24A, 24B and 26A of the airfoils 10A, 10B. The leading and trailing edges 24A, 24B and 26A extend radially in span from the root ends 14A, 14B to the tip ends 18A, 18B of the airfoils 10A, 10B.

The airfoils 10A, 10B are suspended in the circumferential row 12 about the turbine rotor and are spaced circumferentially or laterally apart from one another to define flow passages 30 therebetween for channeling the combustion gases $H_G$ through the turbine section 13 during engine operation. Each flow passage 30 is defined and bounded by the pressure sidewall of one airfoil, e.g., the pressure sidewall 20A of the first airfoil 10A, and the suction sidewall of an adjacent airfoil, e.g., the suction sidewall 22B of the second airfoil 10B. The flow passages 30 are also defined radially between the inner platforms, e.g., the platforms 16A and 16B, and the outer shroud 19.

The hot combustion gases $H_G$ flow through the corresponding flow passages 30 during operation of the engine and are diverged by the individual airfoils 10A, 10B. For example, the combustion gases $H_G$ are diverged in the circumferential direction at the leading edges 24A, 24B of the first and second airfoils 10A, 10B and form corresponding boundary layers along the opposite pressure and suction sidewalls 20A, 20B and 22A, 22B of the airfoils 10A, 10B. The combustion gases $H_G$ also form boundary layers along the individual platforms 16A, 16B, as the combustion gases $H_G$ are diverged at the airfoil leading edges 24A, 24B at their intersections with the platforms 16A, 16B, i.e. at the root ends 14A, 14B. The diverged combustion gases $H_G$ flow along the platforms 16A, 16B, which may result in a pair of counter-rotating horseshoe vortices 36a, 36b (see FIG. 1) that flow axially downstream through the flow passages 30 along the opposite pressure and suction sidewalls 20A, 20B and 22A, 22B of each airfoil 10A, 10B. These horseshoe vortices 36a, 36b create turbulence in the boundary layers and migrate radially outwardly toward mid-span regions of the airfoils 10A, 10B, which creates pressure losses and reduces turbine efficiency. Additional details in connection with the horseshoe vortices 36a, 36b can be found in U.S. Pat. No. 7,134,842, the entire disclosure of which is hereby incorporated by reference herein.

Figure 3:
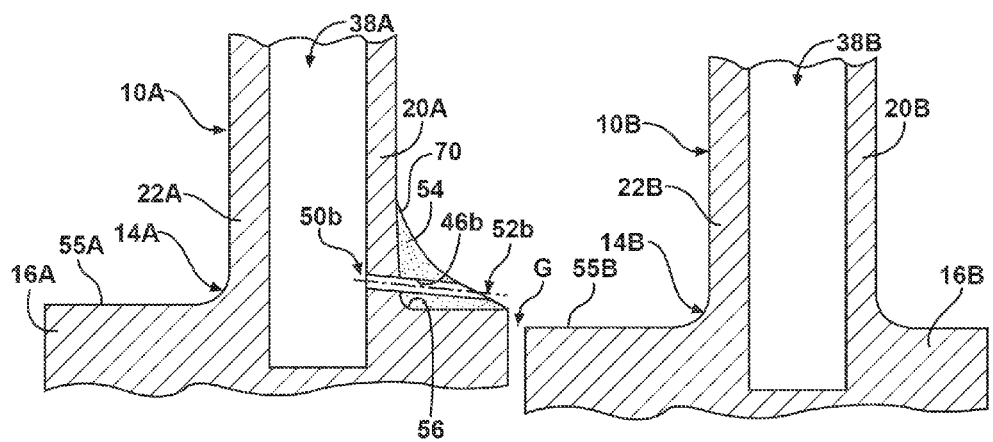
FIG. 3 is a cross sectional view of the portion of the airfoil illustrated in FIG. 2.

Referring additionally to FIG. 3, each airfoil 10A, 10B is hollow and includes a main internal cooling channel 38A, 38B, which is located radially outwardly from the respective platforms 16A, 16B between the opposite pressure and suction sidewalls 20A, 20B and 22A, 22B. The airfoils 10A, 10B include cooling air inlets 40A, 40B (see FIG. 1) extending through their tip ends 18A, 18B and through the outer shroud 19. Cooling air, e.g., compressor bleed air, enters the cooling channels 38A, 38B of the airfoils 10A, 10B via the cooling air inlets 40A, 40B.

Portions of the cooling air are discharged from each airfoil 10A, 10B through several rows of film cooling holes 42A, 42B (see FIG. 1) located in desired areas on the pressure and suction sidewalls 20A, 20B and 22A, 22B of the respective airfoils 10A, 10B. The film cooling holes 42A, 42B may be concentrated near the leading edges 24A, 24B of the airfoils 10A, 10B, although each airfoil 10A, 10B may also include one or more rows of trailing edge cooling holes (not shown) proximate to the trailing edges 26A thereof, and/or one or more rows of cooling holes (not shown) in the pressure and/or suction sidewalls 20A, 20B and 22A, 22B between the leading and trailing edges 24A, 24B and 26A.

Figure 2:
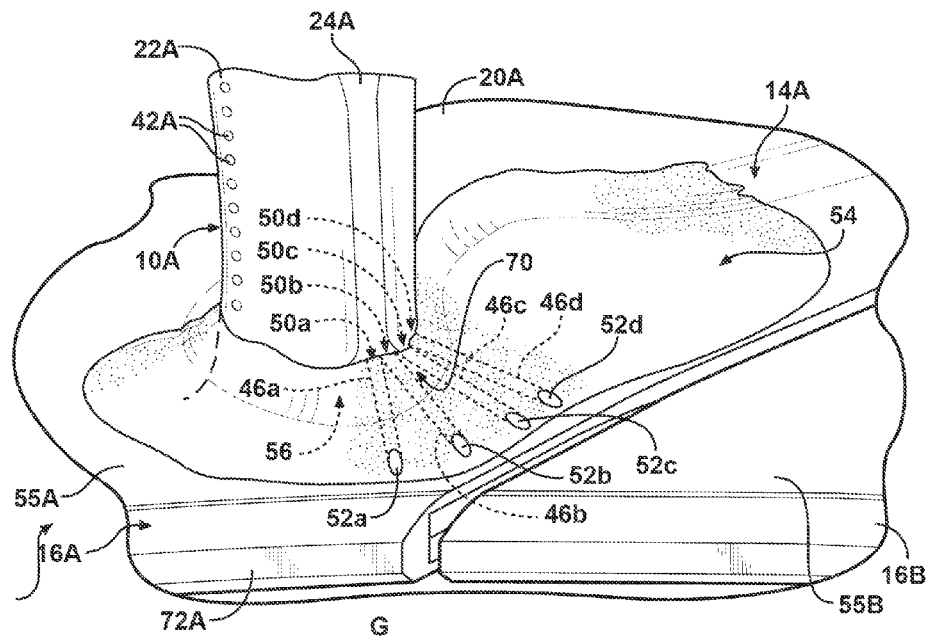
FIG. 2 is an enlarged perspective view illustrating a portion of one of the airfoils shown in FIG. 1.

Referring to FIGS. 2 and 3, a portion of the cooling air in the main cooling channel 38A of the first airfoil 10A is discharged directly from the main cooling channel 38A of the first airfoil 10A through a plurality of primary cooling passages 46, illustrated herein as first through fourth primary cooling passages 46a-46d, proximate to the leading edge 24A of the airfoil 10A. The primary cooling passages 46a-46d are formed in the pressure sidewall 20A of the first airfoil 10A and through a built-up surface 54, which built-up surface 54 will be discussed in detail herein. The primary cooling passages 46a-46d discharge cooling air directly from the main cooling channel 38A to the platform 16A to provide cooling to the platform 16A. It is noted that additional or fewer primary cooling passages 46a-46d may be provided and that only a single primary cooling passage 46 may be utilized to practice this aspect of the invention. It is also noted that the second airfoil 10B may also include one or more primary cooling passages (not shown) formed therein, if desired.

As shown in FIG. 3, the primary cooling passages 46a-46d extend radially inwardly in the circumferential direction toward a gap G between the platforms 16A and 16B from the main cooling channel 38A through the built-up surface 54 formed on the first airfoil 10A. The built-up surface 54 is formed adjacent to the airfoil leading edge 24A at an intersection 56 between the airfoil pressure sidewall 20A and the platform 16A, which intersection 56 is defined at the root end 14A of the airfoil 10A, see FIG. 2. Additional details in connection with the built-up surface 54 will be discussed below.

The primary cooling passages 46a-46d each include an inlet 50a-50d in fluid communication with the main cooling channel 38A in the first airfoil 10A and an outlet 52a-52d at the platform 16A proximate to the gap G. It is noted that the outlets 52a-52d may be formed in the built-up surface 54 adjacent to a location where the built-up surface 54 comes together with a radially outer surface 55A of the platform 16A, as shown in FIGS. 2 and 3. The inlets 50a-50d of the primary cooling passages 46a-46d are each located adjacent to the airfoil leading edge 24A, and the cooling passages 46a-46d fan out such that the outlets 52a-52d thereof provide cooling fluid to spaced apart locations at the platform 16A.

It is noted that the outlet 52a-52d of at least one of the primary cooling passages 46a-46d may be angled away from the direction of flow of hot combustion gases $H_G$ passing through the gas turbine engine during operation thereof, so as to avoid or reduce hot combustion gas $H_G$ ingestion into the cooling passage(s) 46a-46d. In the embodiment shown, the outlet 52d of the fourth primary cooling passage 46d is angled away from the flow of hot combustion gases $H_G$.

As shown in FIG. 2, the built-up surface 54 may comprise, for example, a high heat tolerant weld material that is applied to form a non-axisymmetric contour on the platform 16A, although other suitable materials may be used. The built-up surface 54 may comprise a bump or bulge that extends radially outwardly from the radially outer surface 55A of the platform 16A. The built-up surface 54 increases the area through which the cooling passages 46a-46d may be formed and allows the cooling passages 46a-46d to extend radially inwardly so as to release cooling fluid in a direction toward the platform 16A, which may provide film cooling on the platform 16A.

The built-up surface 54 in the embodiment shown comprises a radially outermost surface 70 on the pressure side adjacent to the airfoil leading edge 24A. The built-up surface 54 decreases in height in each of forward, aft, and circumferential directions away from the radially outermost surface 70, as most clearly shown in FIG. 2. The built-up surface 54 extends in the forward direction to a location forward of the leading edge 24A of the airfoil 10A, at which location the built-up surface 54 comes together with the surface 55A of the platform 16A, such as a location adjacent to a leading edge 72A of the platform 16A, see FIGS. 1 and 2. The built-up surface 54 extends in the aft direction to a location between the airfoil leading and trailing edges 24A, 26A, at which location the built-up surface 54 comes together with the surface 55A of the platform 16A. Further, the built-up surface 54 extends in the circumferential direction toward the gap G to a location between the pressure sidewall 20A of the airfoil 10A and the gap G, at which location the built-up surface 54 comes together with the surface 55A of the platform 16A.

The majority of the built-up surface 54 in the embodiment shown is located adjacent to the leading edge 24A of the airfoil 10A and along the pressure sidewall 20A thereof at the intersection 56 between the pressure sidewall 20A of the first airfoil 10A and the platform 16A. However, a portion of the built-up surface 54 in the embodiment shown extends around the leading edge 24A of the airfoil 10A to the suction side 22A, at which location the built-up surface 54 decreases in height and comes together with the surface 55A of the platform 16A. It is noted that the particular configuration of the built-up surface 54 may depend upon the engine in which the airfoils 10A, 10B are located and the desired effects on the flow of the hot combustion gases $H_G$.

The built-up surface 54 is preferably configured and located so as to reduce the strength of the horseshoe vortices 36a, 36b and thereby improve the efficiency of the engine. Additional details in connection with the configuration and location of built-up surfaces (without cooling passages formed therein) and the effects thereof on the flow of hot combustion gases $H_G$ and the horseshoe vortices 36a, 36b can be found in U.S. Pat. No. 7,134,842.

The cooling fluid from the cooling passages 46a-46d provides direct convection cooling to the built-up material 54 and the platform 16A while passing through the cooling passages 46a-46d, and also provides film cooling to the outer surface 55A of the platform 16A and the built-up surface 54 upon exiting the cooling passage outlets 52a-52d.

As noted above, the cooling passages 46a-46d provide cooling fluid directly from the main cooling channel 38A to the platform 16A, i.e., without requiring the cooling fluid to traverse other cooling fluid circuits or passageways associated with or within the airfoil 10A or the platform 16A before being delivered to the platform 16A. Thus, an amount of cooling fluid provided through the cooling passages 46a-46d to the platform 16A is believed to be increased over prior art airfoils in which cooling fluid delivered to the platform traverses such other cooling circuits or passageways. The cooling passages 46a-46d may be provided in addition to or in place of an existing cooling channel structure such as is described, for example, in U.S. Pat. No. 5,344,283, the entire disclosure of which is hereby incorporated by reference herein.

The built-up surface 54 and cooling passages 46 according to aspects of the invention are believed to provide advantages over the prior art by supplying cooling fluid directly from the main cooling channel 38A to the radially outer surface 55A of the platform 16A at the location adjacent to the leading edge 24A of the airfoil 10A. Since the cooling fluid supplied to the platform 16A comes directly from the main cooling channel 38A, it is believed that a greater flow of cooling fluid at a lower temperature may be provided than is provided in platform cooling systems that distribute the cooling fluid through multiple locations within the platform. Thus, adequate cooling of the radially outer surface 55A of the platform 16A adjacent to the leading edge 24A of the airfoil 10A is believed to be provided, such that a lifespan of the airfoil/platform assembly according to the invention is believed to be increased.

The aspects of the invention described herein may be performed during a repair process to repair/replace damaged airfoil/platform assemblies, such as the airfoil illustrated in U.S. Pat. No. 5,344,283, in situations where platforms 16A adjacent to the leading edge 24A of the airfoil 10A have become damaged/destroyed during engine operation due to overheating and oxidation. Alternatively, the airfoil/platform assembly described herein may be provided as a new component in an engine.

It is noted that the platform 16A associated with the first airfoil 10A is slightly offset from the platform 16B associated with the second airfoil 10B in the radial direction, as shown in FIG. 3. This may result from tolerance issues encountered while assembling the row or airfoils 12. However, since the platform 16A illustrated in FIG. 3 extends radially outwardly further than the platform 16B, cooling fluid flowing out of the cooling passages 46a-46d may flow over the radially outer surface 55A of the platform 16A associated with the first airfoil 10A to a radially outer surface 55B of the platform 16B associated with the second airfoil 10B to cool the platform 16B. It is noted that the platform 16B associated with the second airfoil 10B may extend radially outwardly slightly more than the platform 16A associated with the first airfoil 10A. In this case, the cooling fluid flowing out of the cooling passages 46a-46d may flow over the radially outer surface 55A of the platform 16A associated with the first airfoil 10A and contact the edge of the platform 16B associated with the second airfoil 10B, wherein the cooling fluid could flow radially inwardly into the gap G.

Figure 4:
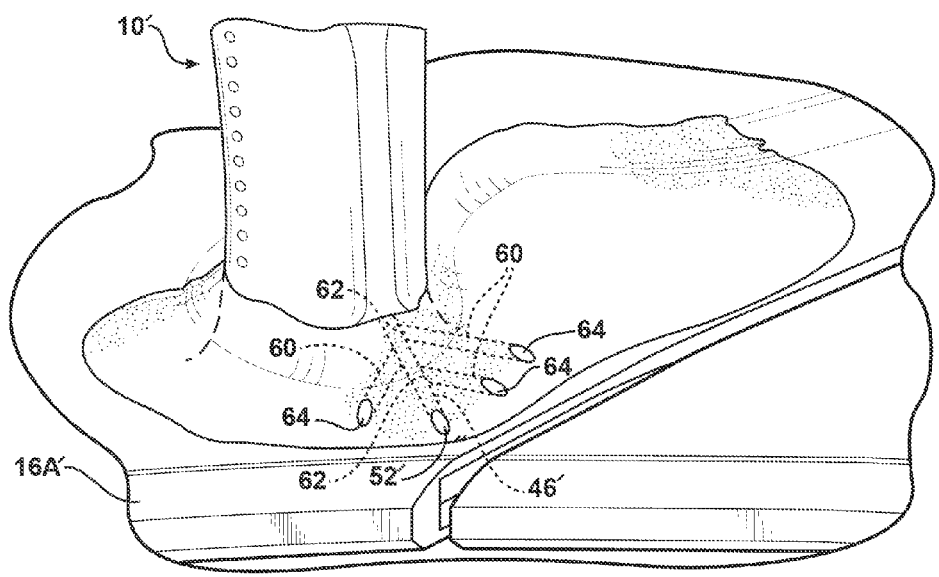
FIG. 4 is an enlarged perspective view illustrating a portion of an airfoil according to another embodiment of the invention.

Referring now to FIG. 4, an airfoil 10' according to another embodiment is shown, where structure similar to that described with reference to FIGS. 1-3 includes the same reference number followed by a prime (') symbol. Each of a plurality of secondary cooling passages 60 according to this embodiment includes an inlet 62 in fluid communication with a primary cooling passage 46', which primary cooling passage 46' communicates with a main cooling channel (not shown in this embodiment) of the airfoil 10A'. That is, the secondary cooling passages 60 according to this embodiment are branched off from the primary cooling passage 46' and fan out to provide cooling fluid from outlets 64 thereof to spaced locations of a platform 16A'. It is noted that the outlet 64 of at least one of the cooling passages 46', 60 according to this embodiment may be angled away from a direction of flow of hot combustion gases passing through the gas turbine engine during operation thereof, so as to avoid or reduce hot combustion gas ingestion into the cooling passage(s) 46', 60.

Figure 5:
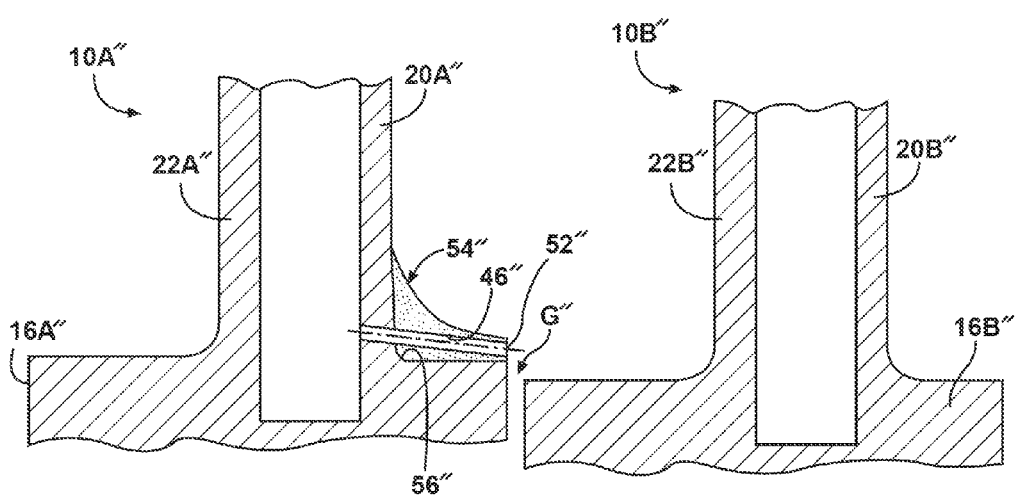
FIG. 5 is a cross sectional view of a portion of an airfoil according to yet another embodiment of the invention.

Referring now to FIG. 5, a first airfoil 10A" according to yet another embodiment is illustrated, where structure similar to that described above with reference to FIGS. 1-3 includes the same reference number followed by a double prime (") symbol. In this embodiment, a built-up surface 54" located at an intersection 56" between a pressure sidewall 20A" of the first airfoil 10A" and a platform 16A" extends in the circumferential direction all the way to a gap G" formed between the platform 16A" and an adjacent platform 16B". Thus, in this embodiment, cooling fluid delivered by one or more primary cooling passages 46" (and, optionally, one or more secondary cooling passages (not shown in this embodiment)) formed at least partially through the built-up surface 54" can be delivered all the way to the circumferential edge of the platform 16A" via an outlet 52" that opens into the gap G" between platform 16A" and the adjacent platform 16B". This may be desirable in some engines, as the portion of the platform 16A" proximate to the gap G" in some engines has been found to be prone to damage caused by overheating and oxidation.

Figure 6:
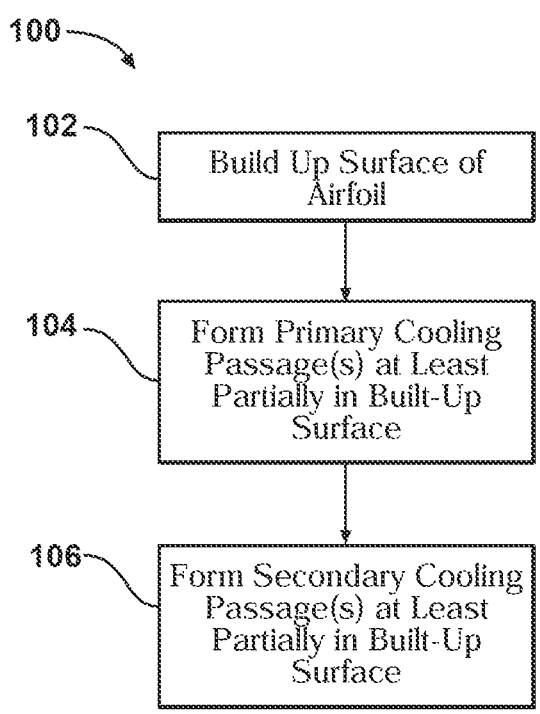
FIG. 6 is a flow chart illustrating steps for servicing an airfoil according to yet another embodiment of the invention.

Referring now to FIG. 6, a method 100 of servicing an airfoil, such as the airfoil 10A described above with reference to FIGS. 1-3, will be described.

At step 102, a surface of the airfoil 10A is built up adjacent to a leading edge 24A of the airfoil 10A at an intersection 56 between a pressure sidewall 20A of the airfoil 10A and a platform 16A associated with the airfoil 10A. The surface is built up by applying a high heat tolerant material, such as a welding material, to the surface. The material may be applied, for example, using laser welding. The built-up surface 54 may be, for example, as described above with reference to FIGS. 1-3 or as described above with reference to FIG. 5.

At step 104, one or more primary cooling passages 46 are formed at least partially within the built-up surface 54 at the intersection 56 between the airfoil pressure sidewall 20A and the platform 16A. The primary cooling passages 46 may be formed, for example, by drilling a corresponding bore through the built-up surface 54. The primary cooling passages 46 are in direct fluid communication with a main cooling channel 38A within the airfoil 10A and each has an outlet 52 at the platform 16A for providing cooling fluid directly from the main cooling channel 38A to the platform 16A. As noted above, the main cooling channel 38A may be located radially outwardly from the platform 16A between the airfoil leading edge 24A and a trailing edge 26A of the airfoil 10A. The primary cooling passages 46 may extend radially inwardly from the main cooling channel 38A and in the circumferential direction toward a gap G between the platform 16A and an adjacent platform 16B through the built-up surface 54 to the outlet 52 at the platform 16A.

At step 106, in an optional step, at least one secondary cooling passage 60 is formed at least partially within the built-up surface 54. The secondary cooling passage(s) 60 has an inlet 62 in communication with the primary cooling passage 46, as described above with respect to FIG. 4. The secondary cooling passage(s) 60 has an outlet 64 at the platform 16A spaced from the outlet 52 of the primary cooling channel 46 for providing cooling fluid from the main cooling channel 38A to the platform 16A.

While the cooling passages 46, 46', 60 and the built-up surface 54 described herein have been described as being formed in stationary vanes, e.g., the airfoils 10A, 10B, these features could also be applied to rotating turbine blades without departing from the spirit and scope of the invention.

Further, as noted above, the cooling passages 46, 46', 60 and the built-up surface 54 described herein may be formed as part of a repair/replacement process or may be implemented in new airfoil designs. Further, the cooling passages 46, 46', 60 and the built-up surface 54 may be formed by other processes than the one described herein. For example, the built-up surface 54 may be applied as a substantially even layer over all or part of the platform 16A and may be machined to form the contoured bump or bulge described herein.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of servicing an airfoil of a gas turbine engine comprising:
building up a surface adjacent to a leading edge of the airfoil at an intersection between the airfoil and a platform associated with the airfoil by applying a high heat tolerant material to the surface; and
forming at least one cooling passage at least partially within the built-up surface at the intersection between the airfoil and the platform, the at least one cooling passage in fluid communication with a main cooling channel within the airfoil, extending radially inwardly from the main cooling channel and having an outlet at a radially outer side of the platform for providing cooling fluid directly from the main cooling channel to the platform.

2. The method of claim 1, wherein building up a surface comprises forming a bulge at the surface, the bulge comprising a radially outermost surface adjacent to the airfoil leading edge at an intersection between an airfoil pressure sidewall and the platform, wherein the bulge decreases in height in each of forward, aft, and circumferential directions away from the radially outermost surface.

3. The method of claim 2, wherein the bulge extends in the forward direction to a location forward of the airfoil leading edge and extends in the aft direction to a location between the airfoil leading edge and a trailing edge of the airfoil.

4. The method of claim 2, wherein the bulge extends in the circumferential direction to a location between the airfoil pressure sidewall and a suction sidewall of an adjacent airfoil.

5. The method of claim 4, wherein the bulge extends in the circumferential direction to a gap formed between the platform of the airfoil and a platform of an adjacent airfoil.

6. The method of claim 5, wherein the outlet of the at least one cooling passage opens into the gap between the platform of the airfoil and the platform of the adjacent airfoil.

7. The method of claim 2, wherein the bulge extends from the airfoil pressure sidewall and around the airfoil leading edge adjacent to the platform to a suction sidewall of the airfoil opposed from the airfoil pressure sidewall.

8. The method of claim 1, wherein the main cooling channel is located radially outwardly from the platform between the airfoil leading edge and a trailing edge of the airfoil.

9. The method of claim 1, wherein forming at least one cooling passage comprises forming a primary cooling passage, and further comprising:
forming at least one secondary cooling passage at least partially within the built-up surface, the at least one secondary cooling passage having:
an inlet in communication with the primary cooling passage; and
an outlet at the platform spaced from the outlet of the primary cooling passage for providing cooling fluid from the main cooling channel to the platform.

10. The method of claim 1, wherein forming at least one cooling passage comprises forming a plurality of cooling passages, the cooling passages having inlets adjacent to the airfoil leading edge in communication with the main cooling channel, wherein the cooling passages fan out to define outlets that are spaced apart from each other at the platform for providing cooling fluid directly from the main cooling channel to the platform.

11. The method of claim 10, wherein the outlet of at least one of the cooling passages is angled away from a direction of hot gas flow passing through the gas turbine engine during operation thereof.

12. A component in a gas turbine engine comprising:
an airfoil extending radially outwardly from a platform associated with said airfoil, said airfoil comprising a pressure sidewall and a suction sidewall opposed from said pressure sidewall, said pressure and suction sidewalls converging at a first location defined at a leading edge of said airfoil and at a second location defined at a trailing edge of said airfoil opposed from said airfoil leading edge;
a built-up surface adjacent to said airfoil leading edge at an intersection between said airfoil pressure sidewall and said platform; and
at least one cooling passage at least partially within said built-up surface at said intersection between said airfoil pressure sidewall and said platform, said at least one cooling passage in fluid communication with a main cooling channel within said airfoil, extending radially inward from said main cooling channel, and having an outlet located on the radially outer side of said platform for providing cooling fluid directly from said main cooling channel to said platform.

13. The component of claim 12, wherein said built-up surface comprises a bulge, said bulge comprising a radially outermost surface adjacent to said airfoil leading edge at said intersection between said airfoil pressure sidewall and said platform, wherein said bulge decreases in height in each of forward, aft, and circumferential directions away from said radially outermost surface.

14. The component of claim 13, wherein:
said bulge extends in the forward direction to a location forward of said airfoil leading edge;
said bulge extends in the aft direction to a location between said airfoil leading edge and said airfoil trailing edge; and
said bulge extends in the circumferential direction to a location between said airfoil pressure sidewall and a suction sidewall of an adjacent airfoil.

15. The component of claim 14, wherein said bulge extends in the circumferential direction to a gap formed between said platform of said airfoil and a platform of an adjacent airfoil, and wherein said outlet of said at least one cooling passage opens into the gap between said platform of said airfoil and the platform of the adjacent airfoil.

16. The component of claim 12, wherein said main cooling channel is located radially outwardly from said platform between said airfoil leading edge and said airfoil trailing edge.

17. The component of claim 12, wherein said at least one cooling passage comprises a primary cooling passage, and further comprising:
at least one secondary cooling passage at least partially within said built-up surface, said at least one secondary cooling passage having:
an inlet in fluid communication with said primary cooling passage; and
an outlet at said platform spaced from said outlet of said primary cooling passage for providing cooling fluid from said main cooling channel to said platform.

18. The component of claim 17, wherein said outlet of at least one of said cooling passages is angled away from a direction of hot gas flow passing through the gas turbine engine during operation thereof.

* * * * *